United States Patent
Endo et al.

(10) Patent No.: US 11,465,286 B2
(45) Date of Patent: Oct. 11, 2022

(54) ROBOT CONTROL APPARATUS, MAINTENANCE MANAGEMENT METHOD, AND MAINTENANCE MANAGEMENT PROGRAM

(71) Applicant: OMRON Corporation, Kyoto (JP)

(72) Inventors: Maki Endo, Kyoto (JP); Yasumoto Mori, Kyoto (JP); Teruyuki Shiraki, Kyotanabe (JP)

(73) Assignee: OMRON Corporation, Kyoto (JP)

( * ) Notice: Subject to any disclaimer, the term of this patent is extended or adjusted under 35 U.S.C. 154(b) by 198 days.

(21) Appl. No.: 17/043,621

(22) PCT Filed: Feb. 22, 2019

(86) PCT No.: PCT/JP2019/006681
§ 371 (c)(1),
(2) Date: Sep. 29, 2020

(87) PCT Pub. No.: WO2019/215992
PCT Pub. Date: Nov. 14, 2019

(65) Prior Publication Data
US 2021/0016443 A1 Jan. 21, 2021

(30) Foreign Application Priority Data
May 8, 2018 (JP) .............................. JP2018-089961

(51) Int. Cl.
*B25J 19/00* (2006.01)
*G05B 19/4065* (2006.01)
*B25J 9/16* (2006.01)

(52) U.S. Cl.
CPC ......... *B25J 9/1674* (2013.01); *B25J 19/0095* (2013.01); *G05B 19/4065* (2013.01); *G05B 2219/37252* (2013.01)

(58) Field of Classification Search
CPC . B25J 9/1674; B25J 19/0095; G05B 19/4065; G05B 2219/37252
See application file for complete search history.

(56) References Cited

U.S. PATENT DOCUMENTS

| | | | |
|---|---|---|---|
| 2011/0071679 A1 | 3/2011 | Barajas et al. | |
| 2017/0185970 A1* | 6/2017 | Nakazato | G06Q 10/20 |

FOREIGN PATENT DOCUMENTS

| | | |
|---|---|---|
| JP | H10274558 | 10/1998 |
| JP | H11173909 | 7/1999 |

(Continued)

OTHER PUBLICATIONS

"International Search Report (Form PCT/ISA/210) of PCT/JP2019/006681", dated Apr. 23, 2019, with English translation thereof, pp. 1-2.

(Continued)

*Primary Examiner* — Manuel A Rivera Vargas
(74) *Attorney, Agent, or Firm* — JCIPRNET

(57) ABSTRACT

A remaining life of a robot body is precisely estimated. A robot control apparatus 300 includes: a drive control unit 305 that controls drive of a robot body 200; a detection unit 306 that detects a feature amount quantitatively indicating a deterioration degree of the robot body 200 that is deteriorated over time as the robot body 200 is driven; a determination unit 303 that determinates presence/absence of a sign of malfunction of the robot body 200 based on the feature amount; and an estimation unit 304 that estimates a remaining life of the robot body 200 when presence of a sign of malfunction of the robot body 200 is determined.

6 Claims, 6 Drawing Sheets

(56) References Cited

FOREIGN PATENT DOCUMENTS

| | | |
|---|---|---|
| JP | 2006258535 | 9/2006 |
| JP | 2008032477 | 2/2008 |
| JP | 2016117148 | 6/2016 |
| JP | 2017120532 | 7/2017 |
| JP | 2017120649 | 7/2017 |
| JP | 2017188030 | 10/2017 |
| WO | 2018003879 | 1/2018 |

OTHER PUBLICATIONS

"Written Opinion of the International Searching Authority (Form PCT/ISA/237) of PCT/JP2019/006681", dated Apr. 23, 2019, with English translation thereof, pp. 1-6.

"Office Action of Japan Counterpart Application" with English translation thereof, dated Feb. 18, 2022, p. 1-p. 65.

"Search Report of Europe Counterpart Application", dated Jan. 4, 2022, p. 1-p. 8.

* cited by examiner

ROBOT CONTROL APPARATUS, MAINTENANCE MANAGEMENT METHOD, AND MAINTENANCE MANAGEMENT PROGRAM

CROSS-REFERENCE TO RELATED APPLICATION

This application is a 371 application of the International PCT application serial no. PCT/JP2019/006681, filed on Feb. 22, 2019, which claims the priority benefit of Japan Patent Application No. 2018-089961, filed on May 8, 2018. The entirety of each of the above-mentioned patent applications is hereby incorporated by reference herein and made a part of this specification.

BACKGROUND

Technical Field

The present invention relates to a robot control apparatus, a maintenance management method, and a maintenance management program.

Related Art

In a production line that manufactures industrial products, plural robots operate in cooperation with each other, and thus, even if one robot fails, the production line may stop. For example, in a robot configured to amplify an output torque of a motor by using a speed reducer and transmit the amplified torque to an arm, if progress of aging deterioration of a drive system (for example, wear of a gear mechanism of the speed reducer or the like) is left unattended, malfunction may occur. Because it takes a long time to repair a robot, a remaining life until the robot fails is desirable to be predicted as accurately as possible from the viewpoint of avoiding a long stoppage of the production line. In view of this circumstance, patent literature 1 (Japanese Patent Laid-Open No. 2016-117148) proposes a method of calculating an expected elapsed time until a current command value reaches a predetermined threshold value from a future change tendency of the current command value of the motor that drives the arm and estimating the remaining life from the expected elapsed time.

SUMMARY

However, in an initial stage of aging deterioration of the robot, even though aging deterioration has progressed, almost no change quantitatively indicating a deterioration degree appears in the current command value of the motor, and thus it is difficult to accurately determine the deterioration degree based on the detected current command value. A certain amount of time is required until the change that quantitatively indicates the deterioration degree appears in the current command value of the motor and the deterioration degree can be significantly detected.

However, conventionally, the remaining life is estimated based on the detected current command value even in the initial stage of aging deterioration in which almost no change quantitatively indicating the deterioration degree appears in the current command value of the motor, and thus estimation precision is low, which is not practically sufficient. For this reason, it is necessary to store spare components in case of a robot malfunction or to regularly inspect the robot, and efficiency improvement of maintenance management is desired.

Thus, an object of the present invention is to propose a technique capable of solving this problem and precisely estimating a remaining life of a robot body.

In order to solve the aforementioned problems, the robot control apparatus according to the present invention includes: a drive control unit that controls drive of a robot body; a detection unit that detects a feature amount quantitatively indicating a deterioration degree of the robot body that is deteriorated over time as the robot body is driven; a determination unit that determines presence/absence of a sign of malfunction of the robot body based on the feature amount; and an estimation unit that estimates a remaining life of the robot body when presence of a sign of malfunction of the robot body is determined. Accordingly, instead of estimating the remaining life of the robot body before the sign of malfunction of the robot body is detected, the remaining life of the robot body is estimated after the sign of malfunction of the robot body is detected, and thereby the estimation precision of the remaining life can be improved.

The determination unit may determinate that there is a sign of malfunction of the robot body when a change quantitatively indicating a deterioration degree of the robot body begins to significantly appear in the feature amount. Thereby, the sign of malfunction can be accurately judged.

The estimation unit may estimate, from a tendency of a change over time in the feature amount, a malfunction time at which the feature amount is expected to exceed a threshold value preset to indicate malfunction of the robot body, and estimate duration from a present point to the malfunction time as the remaining life. After the sign of malfunction is detected, a magnitude of the feature amount begins to significantly increase with passage of time, and thus the remaining life can be precisely estimated from the tendency of the change over time in the feature amount.

The feature amount quantitatively indicating the deterioration degree of the robot body that is deteriorated over time as the robot body is driven may include vibration or sound generated from the robot body. In addition, the robot body may include an arm and a motor that rotates a rotation shaft transmitting power to the arm, and the feature amount quantitatively indicating the deterioration degree of the robot body that is deteriorated over time as the robot body is driven may include a current command value of the motor. By using any of sound, vibration, or the current command value as the feature amount quantitatively indicating the deterioration degree of the robot body that is deteriorated over time as the robot body is driven, the sign of malfunction can be detected without disassembling the robot body.

In a maintenance management method according to the present invention, a robot control apparatus executes: a step of controlling drive of a robot body; a step of detecting a feature amount quantitatively indicating a deterioration degree of the robot body that is deteriorated over time as the robot body is driven; a step of determining presence/absence of a sign of malfunction of the robot body based on the feature amount; and a step of estimating a remaining life of the robot body when presence of a sign of malfunction of the robot body is determined. Accordingly, instead of estimating the remaining life of the robot body before the sign of malfunction of the robot body is detected, the remaining life of the robot body is estimated after the sign of malfunction of the robot body is detected, and thereby the estimation precision of the remaining life can be improved.

A maintenance management program according to the present invention enables a robot control apparatus to execute: a step of controlling drive of a robot body; a step of detecting a feature amount quantitatively indicating a deterioration degree of the robot body that is deteriorated over time as the robot body is driven; a step of determining presence/absence of a sign of malfunction of the robot body based on the feature amount; and a step of estimating a remaining life of the robot body when presence of a sign of malfunction of the robot body is determined. Accordingly, instead of estimating the remaining life of the robot body before the sign of malfunction of the robot body is detected, the remaining life of the robot body is estimated after the sign of malfunction of the robot body is detected, and thereby the estimation precision of the remaining life can be improved.

According to the present invention, the remaining life of the robot body can be precisely estimated.

DESCRIPTION OF THE EMBODIMENTS

Figure 1:
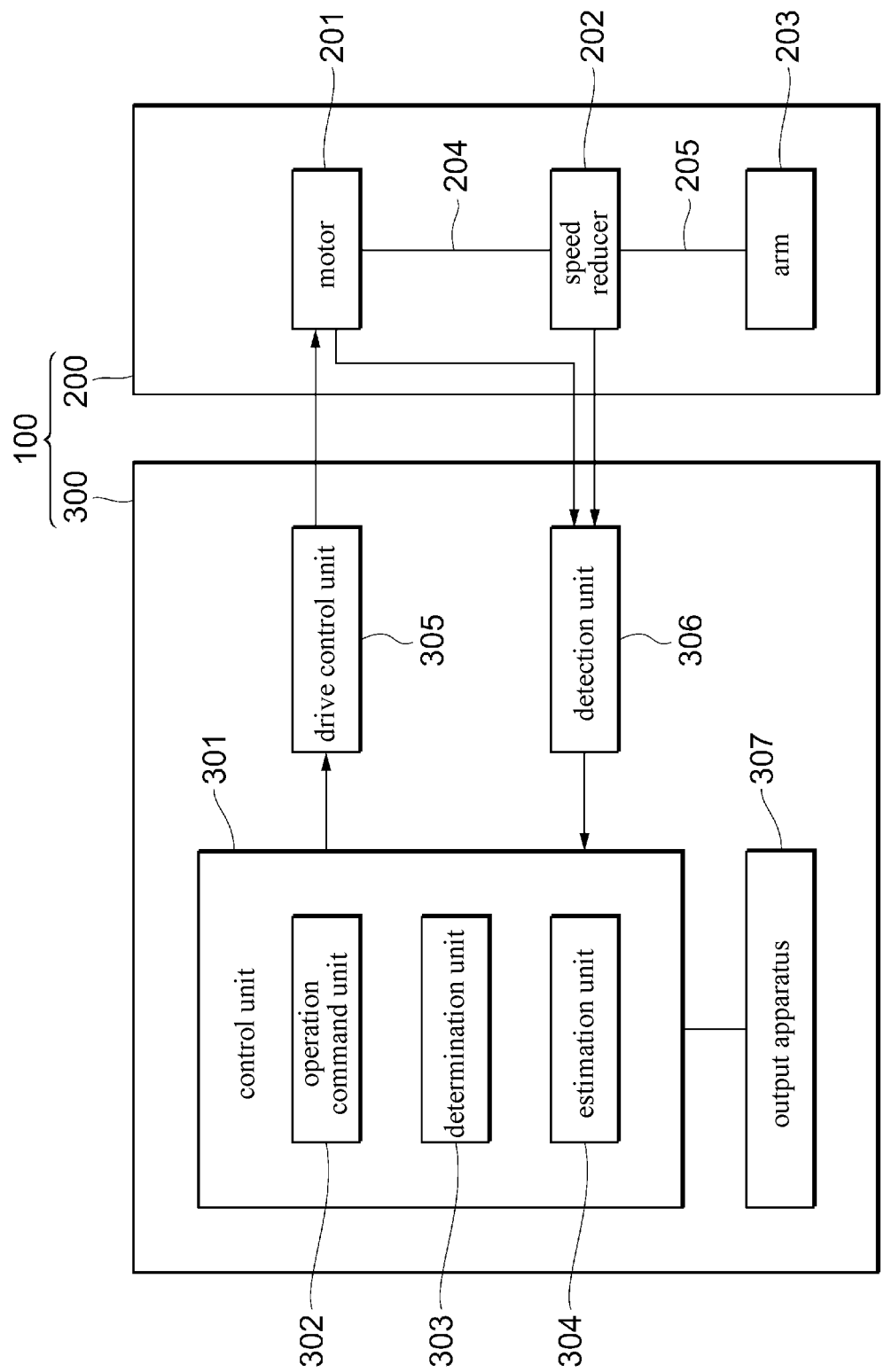
FIG. 1 is an illustration diagram showing an example of a configuration of a robot according to an embodiment of the present invention.

An embodiment according to one aspect of the present invention is described below based on the drawings. The embodiment of the present invention is intended for facilitating the understanding of the present invention and not for limiting interpretation of the present invention. The present invention can be modified or improved without departing from the spirit thereof, and the present invention also includes equivalents thereof. Moreover, the same reference numerals denote the same components, and repeated description is omitted.

Application Example

First, an application example of the present invention is described with reference to FIG. 1. FIG. 1 shows an example of a configuration of a robot 100 according to the embodiment of the present invention. The robot 100 may include, for example, a robot body 200 that autonomously operates as a manipulator, and a robot control apparatus 300 that controls the operation of the robot body 200. A specific example of the robot 100 may be a vertical articulated robot, a horizontal articulated robot, an orthogonal robot, a parallel link robot, or the like. The robot 100 can be used for any purpose such as assembly of components, transportation, painting, inspection, polishing, cleaning, or the like.

The robot main body 200 may include, for example, an arm 203 that operates as a manipulator, a motor 201 that rotates a rotation shaft 204 that transmits power to the arm 203, and a speed reducer 202 that reduces a rotation speed of the rotation shaft 204 to increase the torque and transmits power having the increased torque to the arm 203 through an output shaft 205. Here, the rotation shaft 204 is, for example, an output shaft of the motor 201. For convenience of description, FIG. 1 illustrates a case where the number of shafts (the number of joints) of the robot body 200 is one, but the number of shafts may be two or more (for example, four to seven shafts).

The robot control apparatus 300 may include, for example, an operation command unit 302 that generates an operation command for the motor 201, a drive control unit 305 that controls the drive of the motor 201 in response to the operation command from the operation command unit 302, a detection unit 306 that detects a feature amount quantitatively indicating a deterioration degree of the robot body 200 that is deteriorated over time as the robot body 200 is driven, a determination unit 303 that determinates presence/absence of a sign of malfunction of the robot body 200 based on the detected feature amount, and an estimation unit 304 that estimates a remaining life of the robot body 200 when presence of a sign of malfunction of the robot body 200 is determined. The feature amount quantitatively indicating the deterioration degree of the robot body 200 may be vibration (for example, amplitude and frequency of a vibration component) or sound (for example, amplitude and frequency of sound) generated from a component (for example, a speed reducer 202) of the robot body 200, or a current command value (for example, amplitude and frequency of the current command value) of the motor 201. The robot control apparatus 300 may include, for example, a control unit 301 having a microcomputer, and functions of the operation command unit 302, the determination unit 303, and the estimation unit 304 may be realized by an information processing function of the microcomputer of the control unit 301.

The robot control apparatus 300 may further include an output apparatus 307 that outputs information indicating the remaining life of the robot body 200. The output apparatus 307 may be a display apparatus (for example, a flat panel display such as a liquid crystal display, an electroluminescent display or a plasma display) that conveys the remaining life through visually recognizable information such as characters or symbols, or an acoustic apparatus (for example, a speaker apparatus) that conveys the remaining life through auditorily recognizable information such as an acoustic signal or the like. The output apparatus 307 may be a communication apparatus that transmits information indicating the remaining life of the robot body 200 via a wired channel or a wireless channel. The destination of the information indicating the remaining life may be, for example, a communication terminal of a user (for example, a mobile communication terminal called a smartphone, a smart watch, or a tablet terminal, or a personal computer having a communication function), or an external machine having a communication function.

Figure 2:
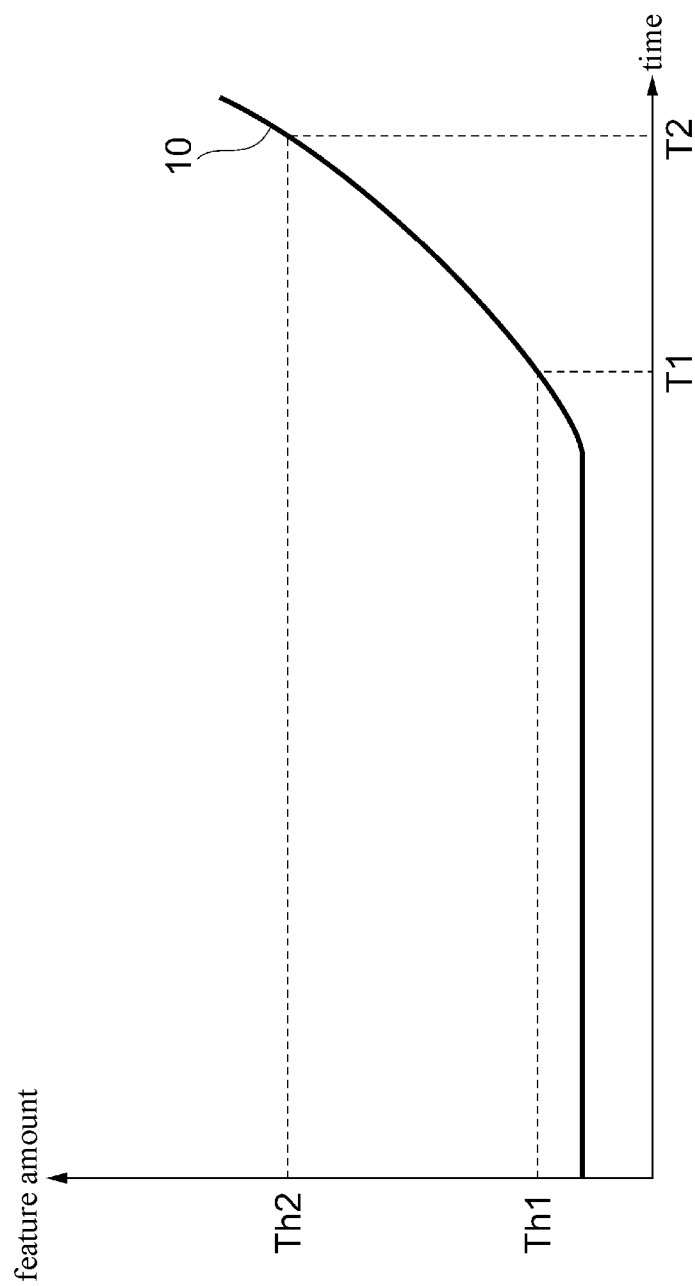
FIG. 2 is a graph showing a change over time in a feature amount that quantitatively shows a deterioration degree of a robot body according to the embodiment of the present invention.

FIG. 2 shows a graph 10 showing a change over time in a feature amount quantitatively indicating the deterioration degree of the robot body 200. The horizontal axis of FIG. 2 represents time, and the vertical axis represents the magnitude of the feature amount (for example, amplitude of the vibration component). The greater the deterioration degree of the robot body 200, the greater the magnitude of feature amount tends to be. In the specification, the phenomenon in which a change quantitatively indicating the deterioration degree of the robot body 200 begins to appear significantly in the feature amount is referred to as a "sign of malfunction", and the time at which the sign of malfunction is detected is referred to as a "sign detection time". A reference sign Th1 indicates a threshold value preset to indicate the sign of malfunction of the robot body 200. The threshold value Th1 is, for example, the magnitude of a feature amount at the time when the change quantitatively indicating the deterioration degree of the robot body 200 starts to significantly appear in the feature amount. The threshold value Th1 may be determined by judgment of the user from a past statistical tendency of the change over time in the feature amount that quantitatively indicates the deterioration degree of each of plural robot bodies, or the threshold value Th1 may be automatically determined based on judgment of the determination unit 303. A reference sign T1 indicates the sign detection time. In the specification, a state in which a normal operation of the robot body 200 is significantly hindered is referred to as a "malfunction", and the time when the malfunction occurs is referred to as a "malfunction time". A reference sign Th2 indicates a threshold value preset to indicate malfunction of the robot body 200. The threshold value Th2 is, for example, the magnitude of a feature amount when a significant hindrance to the normal operation of the robot body 200 begins to occur. The threshold value Th2 may be determined by judgment of the user from the past statistical tendency of the change over time in the feature amount that quantitatively indicates the deterioration degree of each of plural robot bodies, or the threshold value Th2 may be automatically determined based on judgment of the determination unit 303. A reference sign T2 indicates the malfunction time.

At the initial stage of aging deterioration of the robot body 200, although the aging deterioration is progressing, almost no change quantitatively indicating the deterioration degree appears in the feature amount. When the feature amount is equal to or less than the threshold value Th1, the determination unit 303 determines that there is no sign of malfunction of the robot body 200. Then, when the feature amount exceeds the threshold value Th1, the determination unit 303 determines that there is a sign of malfunction of the robot body 200. When a sign of malfunction is detected, an amount of the change in the feature amount significantly increases with time. The estimation unit 304 estimates, for example, the malfunction time T2 at which the feature amount is expected to exceed the threshold value Th2 from the tendency of the change over time in the feature amount from the sign detection time T1 to the present point. The estimation unit 304 may estimate duration from the present point to the malfunction time T2 as the remaining life. Accordingly, instead of estimating the remaining life of the robot body 200 before the sign of malfunction of the robot body 200 is detected, the remaining life of the robot body 200 is estimated after the sign of malfunction of the robot body 200 is detected, and thereby the estimation precision of the remaining life can be improved on the whole.

Hardware Configuration

Figure 3:
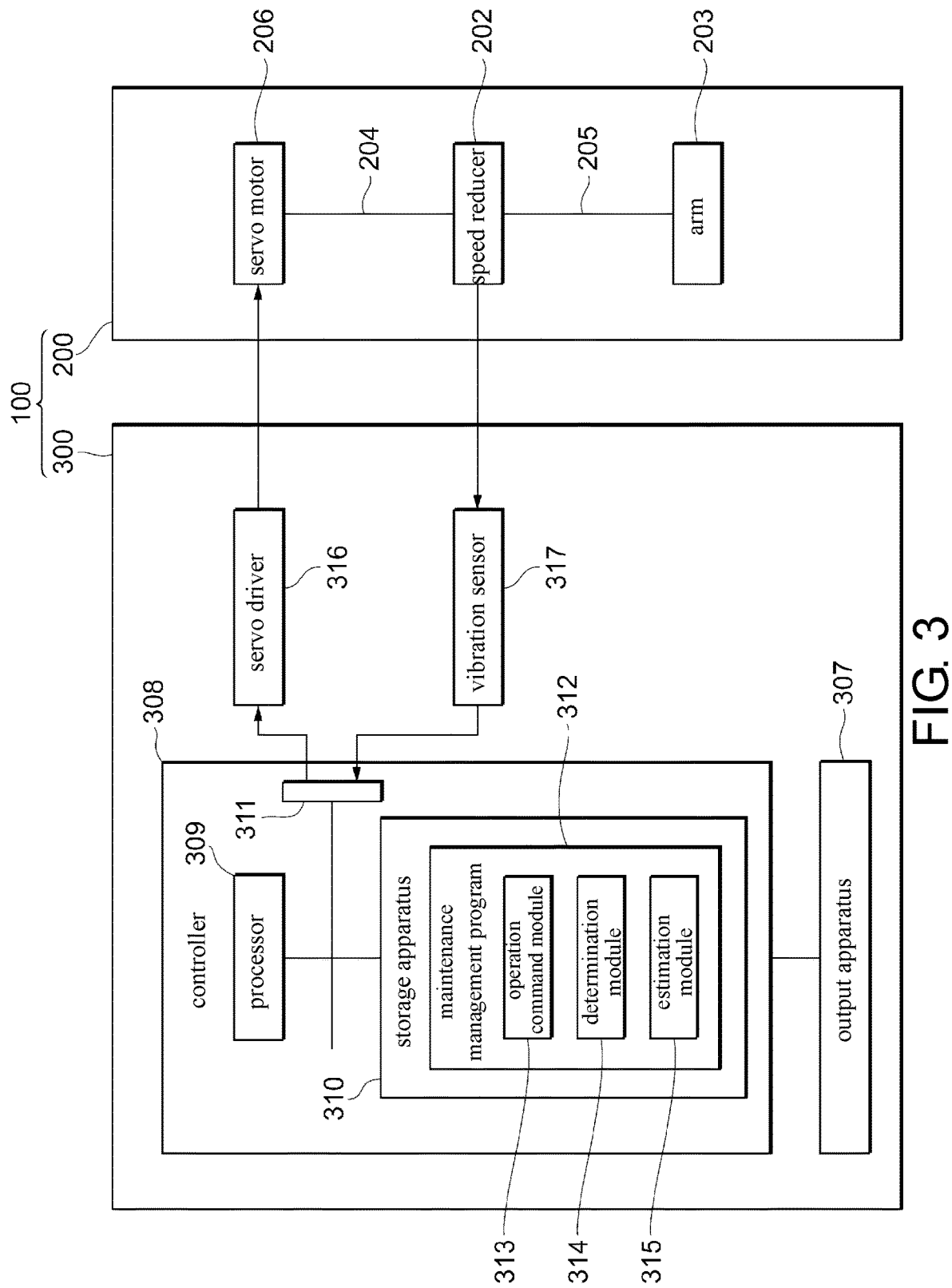
FIG. 3 is an illustration diagram showing an example of a hardware configuration of the robot according to the embodiment of the present invention.

Next, an example of a hardware configuration of the robot 100 is described focusing on FIG. 3 and referring to FIG. 1 appropriately.

The robot body 200 includes a servo motor 206 with an encoder as an example of the motor 201 shown in FIG. 1

The robot control apparatus 300 includes a controller 308 as an example of the control unit 301 shown in FIG. 1.

The controller 308 may be a microcomputer including, for example, a processor 309, a storage apparatus 310, and an input/output interface 311 as hardware resources. The storage apparatus 310 may store a maintenance management program 312 for executing the maintenance management method according to the embodiment of the present invention, and the maintenance management program 312 may include plural software modules (for example, an operation command module 313, a determination module 314, and an estimation module 315) that are called and executed in a main program. The storage apparatus 310 is, for example, a computer-readable recording medium such as a semiconductor memory, a disk medium, or the like.

The operation command module 313 is interpreted and executed by the processor 309, and the hardware resources of the controller 308 and the operation command module 313 cooperate to realize the function of the operation command unit 302 shown in FIG. 1. The determination module 314 is interpreted and executed by the processor 309, and the hardware resources of the controller 308 and the determination module 314 cooperate to realize the function of the determination unit 303 shown in FIG. 1. The estimation module 315 is interpreted and executed by the processor 309, and the hardware resources of the controller 308 and the estimation module 315 cooperate to realize the function of the estimation unit 304 shown in FIG. 1. Accordingly, the functions of the operation command unit 302, the determination unit 303, and the estimation unit 304 may be realized by cooperation between the hardware resources of the controller 308 and the maintenance management program 312, or may be realized using dedicated hardware resources (for example, an application specific integrated circuit (ASIC), a field programmable gate array (FPGA), or the like) or firmware.

The robot control apparatus 300 includes a servo driver 316 as an example of the drive controller 305 shown in FIG. 1.

The robot control apparatus 300 includes, as an example of the detection unit 306 shown in FIG. 1, a vibration sensor 317 that detects a vibration generated from a component of the robot body 200 (for example, the speed reducer 202).

Moreover, the speed reducer 202 may include, for example, a bearing mechanism or a gear mechanism in which the rotation is interlocked with rotation of the rotation shaft 204, and vibration may occur due to aging deterioration of the bearing mechanism or the gear mechanism. The cause of the vibration is not limited to the aging deterioration of the speed reducer 202. For example, the vibration may be caused by aging deterioration of components that are interlocked with the rotation of the rotation shaft 204. As the speed reducer 202, for example, a wave gear apparatus called Harmonic Drive (registered trademark) may be used.

Maintenance Management Method

Figure 4:
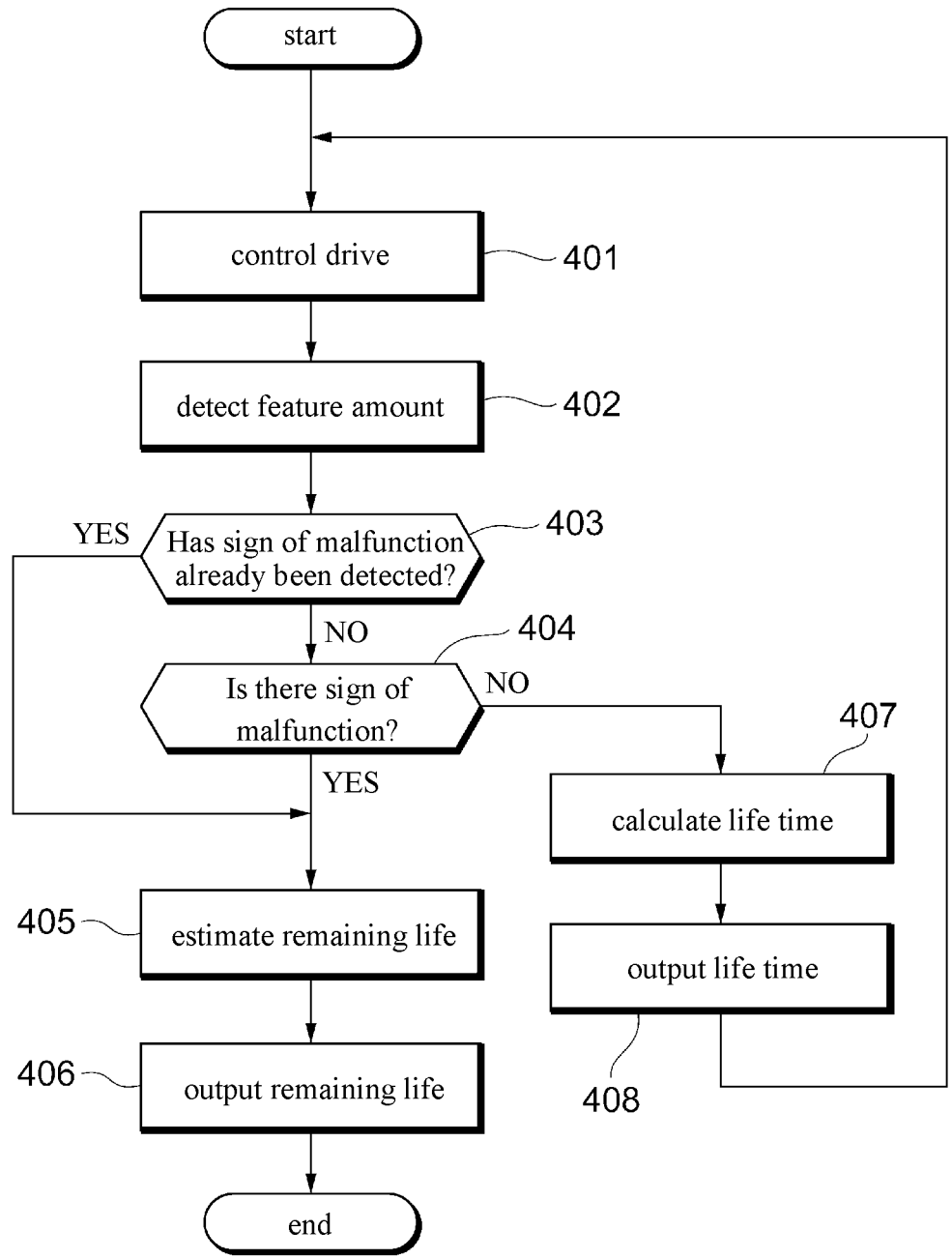
FIG. 4 is a flowchart showing an example of a maintenance management method according to the embodiment of the present invention.

Next, an example of the maintenance management method according to the embodiment of the present invention is described with reference to FIG. 4.

In step 401, the servo driver 316 controls drive of the robot body 200.

In step 402, the vibration sensor 317 detects the feature amount (for example, the amplitude, the frequency, or the like of the vibration component) quantitatively indicating the deterioration degree of the robot body 200 that is deteriorated over time as the robot body 200 is driven.

In step 403, the determination module 314 determines whether the sign of malfunction of the robot body 200 has already been detected.

In step 404, the determination module 314 determines presence/absence of a sign of malfunction of the robot body 200 based on the feature amount detected in step 402. Details of step 404 are described later.

In step 405, the estimation module 315 estimates the remaining life of the robot body 200. Details of step 405 are described later.

In step 406, the output apparatus 307 outputs information indicating the remaining life estimated in step 405.

In step 407, the estimation module 315 calculates a life time Lh based on actual operating conditions of the robot body 200. For example, if a life time of the reducer 202 at a guarantee probability of 10% is set as L10, a rated torque is set as Tr, a rated rotation speed is set as Nr, an average load torque on the output side is set as Tar, and an average input rotation speed is set as Nav, the calculation can be made with the equation of life time $Lh=L10\,(Tr/Tar)^3\,(Nr/Nav)$. The life time Lh calculated based on the actual operating conditions is a tentative standard for judging the malfunction time.

In step 408, the output apparatus 307 outputs the information indicating the life time Lh calculated in step 407.

Moreover, the steps 401 to 408 may be regularly repeated when the robot body 200 is operating. Once the sign of malfunction of the robot body 200 is detected, the steps 404, 407 and 408 are omitted thereafter. An execution frequency of step 404 and an execution frequency of step 405 may be the same or different. For example, the execution frequency of step 404 may be once every 10 minutes, and the execution frequency of step 405 may be once a day. In addition, steps 407 and 408 are not essential and thus may be omitted.

Figure 5:
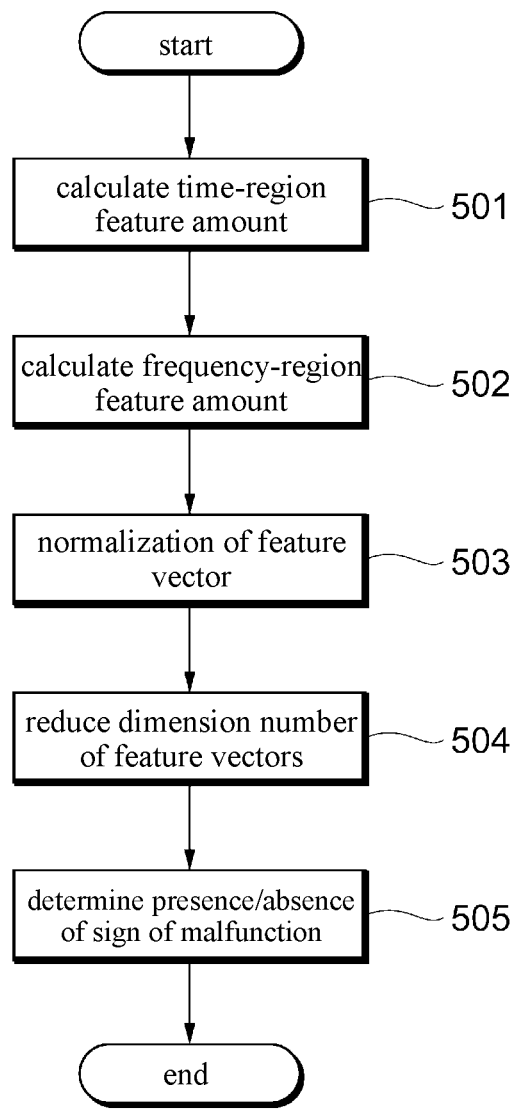
FIG. 5 is a flowchart showing an example of determination processing of presence/absence of a sign of malfunction according to the embodiment of the present invention.

Next, an example of the determination processing of the presence/absence of malfunction sign in step 404 is described with reference to FIG. 5.

In step 501, the determination module 314 calculates a time-region feature amount for the feature amount detected in step 402. The time-region feature amount may be (1) an average value, (2) a standard deviation, (3) a maximum value, (4) a minimum value, (5) a skewness, (6) a kurtosis, (7) a root mean square, (8) an amplitude, (9) a wave crest factor, or the like.

In step 502, the determination module 314 calculates a frequency-region feature amount for the feature amount detected in step 402. The frequency-region feature may be (1) a rotation frequency, (2) an inner ring flaw frequency, (3) an outer ring flaw frequency, or the like. Here, a harmonic order is set as k, the rotation frequency is set as f, a wave generator inner diameter is set as R1, a wave generator outer diameter is set as R2, the number of bearing balls is set as Bn, and a reduction ratio is set as C. The rotation frequency of the kth harmonic can be calculated as k×f. The inner ring flaw frequency of the kth harmonic can be calculated as k×R2×(1+C)×Bn×f/(R1+R2). The outer ring flaw frequency of the kth harmonic can be calculated as k×R1×(1+C)×Bn×f/(R1+R2).

In step 503, the determination module 314 creates feature vectors using one or more time-region feature amounts calculated in step 501 and one or more frequency-region feature amounts calculated in step 502, and normalizes the feature vectors.

In step 504, the determination module 314 reduces the dimension number of the feature vectors obtained in step 503.

In step 505, the determination module 314 determines the presence/absence of the sign of malfunction by a one-class identification method or a two-class identification method using the feature vector obtained in step 504. In the one-class identification method, the feature amount of the robot body 200 in which a sign of malfunction has not been detected is learned in advance, and whether the feature vector obtained in step 504 belongs to a class in which no sign of malfunction is detected may be determined. In the two-class identification method, a feature amount of the other robot body in which no sign of malfunction is detected and a feature amount of the other robot body in which a sign of malfunction is detected are respectively learned in advance, and whether the feature vector obtained in step 504 belongs to a class in which no sign of malfunction is detected or a class in which a sign of malfunction is detected may be determined.

Moreover, the feature vector used to determine the presence/absence of the sign of malfunction does not necessarily include one or more time-region feature amounts and one or more frequency-region feature amounts. For example, the feature vector may include one or more frequency-region feature amounts without including the time-region feature amount, or may include one or more time-region feature amounts without including the frequency-region feature amount.

In addition, in the step of determining the presence/absence of the sign of malfunction in step 505, it is not always necessary to the class identification method, and for example, the presence/absence of the sign of malfunction may be determined by comparing any one of the time-region feature amounts with a threshold value, or the presence/absence of the sign of malfunction may be determined by comparing any one of the frequency-region feature amounts with a threshold value. For example, when the presence/absence of the sign of malfunction is determined by comparing any one of the time-region feature amounts with the threshold value in step 505, steps 503 and 504 may be omitted. In addition, for example, when the presence/absence of the sign of malfunction is determined by comparing any one of the frequency-region feature amounts with the threshold value in step 505, steps 503 and 504 may be omitted.

Figure 6:
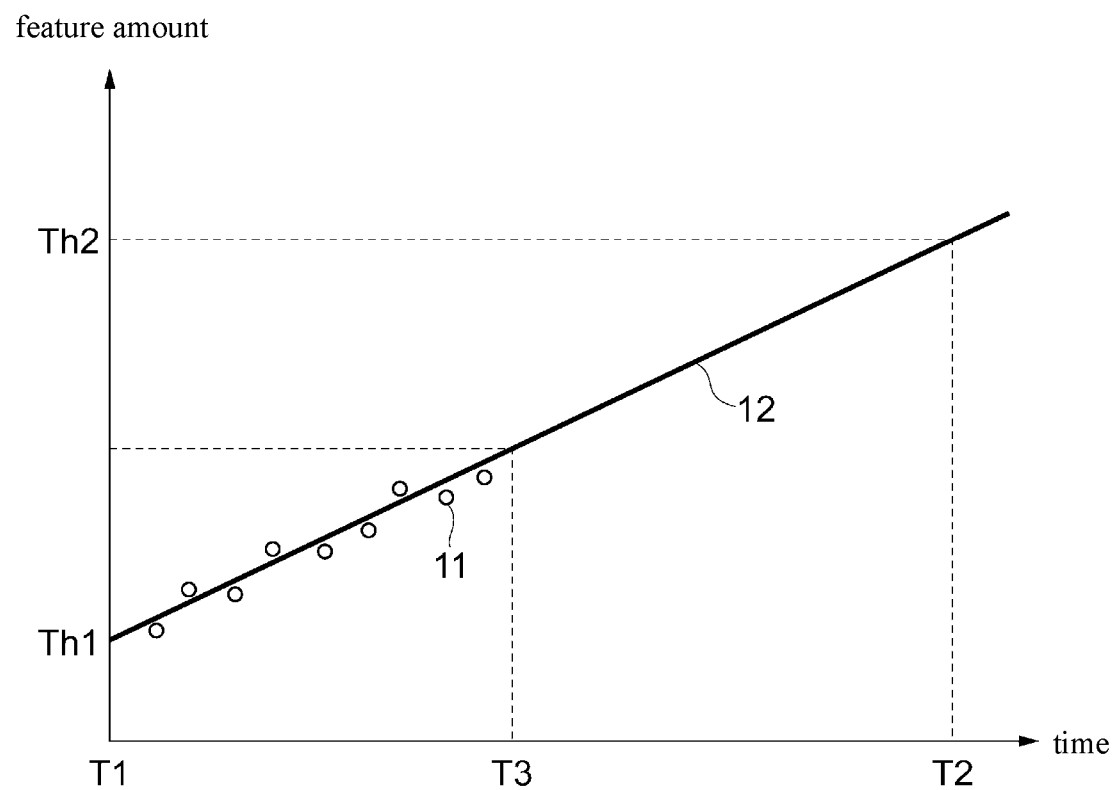
FIG. 6 is an illustration diagram showing an example of processing of estimating a remaining life according to the embodiment of the present invention.

Next, an example of the processing of estimating the remaining life in step 405 is described with reference to FIG. 6. The horizontal axis of FIG. 6 represents time, and the vertical axis represents the magnitude of the feature amount (for example, the amplitude of the vibration component). A reference numeral 11 indicates a feature amount 11 detected from the sign detection time T1 to a present point T3. The estimation module 315 analyzes a regression line 12 that approximates the change over time in the feature amount 11 from the sign detection time T1 to the present point T3. The regression line 12 may be, for example, a single regression line. The estimation module 315 estimates, based on the regression line 12, the malfunction time T2 at which the feature amount is expected to exceed the threshold value Th2. The estimation module 315 estimates duration from the present point T3 to the malfunction time T2 as the remaining life. Here, a case of estimating the malfunction time T2 from a tendency of the change over time in the feature amount 11 from the sign detection time T1 to the present point T3 is described, but the malfunction time T2 may also be estimated from a tendency of a change over time in a distance from the sign detection time T1 to the present point T3 (for example, a distance calculated by the one-class identification method in step 505).

In the above description, as an example of the feature amount quantitatively indicating the deterioration degree of the robot body 200, the vibration (for example, the amplitude and frequency of the vibration component) generated from the component of the robot body 200 (for example, the speed reducer 202) is illustrated, but when sound (for example, the amplitude and frequency of the sound) is used as the feature amount, a sound collecting apparatus that collects the sound from the robot body 200 may be used as the detection unit 306. In addition, when the current command value of the motor 201 (for example, the amplitude and frequency of the current command value) is used as the feature amount, a device that acquires the current command of the motor 201 may be used as the detection unit 306. Moreover, a combination of any two or more of vibration, sound, and current command value may be used to detect the sign of malfunction of the robot body 200.

According to the embodiment, instead of estimating the remaining life of the robot body 200 before the sign of malfunction of the robot body 200 is detected, the remaining life of the robot body 200 is estimated after the sign of malfunction of the robot body 200 is detected, and thereby the estimation precision of the remaining life can be improved, which can be useful for long-term maintenance management of the robot 100. For example, management cost of components to be stored in case of malfunction of the robot 100 and cost of regular inspection of the robot 100 can be suppressed.

Moreover, the robot 100 according to the embodiment of the present invention is not limited to an industrial robot used for factory automation, and may be, for example, a robot used for the service industry (for example, an operating robot, a medical robot, a cleaning robot, a rescue robot, a security robot, or the like).

APPENDIXES

The whole or part of the embodiment of the present invention can be described as, but not limited to, the following appendixes.

Appendix 1

A robot control apparatus 300, including:
a drive control unit 305 that controls drive of a robot body 200;
a detection unit 306 that detects a feature amount quantitatively indicating a deterioration degree of the robot body 200 that is deteriorated over time as the robot body 200 is driven;
a determination unit 303 that determines presence/absence of a sign of malfunction of the robot body 200 based on the feature amount; and
an estimation unit 304 that estimates a remaining life of the robot body 200 when presence of a sign of malfunction of the robot body 200 is determined.

Appendix 2

The robot control apparatus 300 according to Appendix 1, wherein
the determination unit 303 determines that there is a sign of malfunction of the robot body 200 when a change quantitatively indicating the deterioration degree of the robot body 200 begins to significantly appear in the feature amount.

Appendix 3

The robot control apparatus 300 according to Appendix 1 or 2, wherein the estimation unit 304 estimates, from a tendency of a change over time in the feature amount, a malfunction time T2 at which the feature amount is expected to exceed a threshold value preset to indicate malfunction of the robot body 200, and estimates duration from a present point T3 to the malfunction time T2 as the remaining life.

Appendix 4

The robot control apparatus 300 according to any one of Appendixes 1 to 3, wherein the feature amount includes a time-region feature amount and a frequency-region feature amount.

Appendix 5

The robot control apparatus 300 according to any one of Appendixes 1 to 4, wherein the feature amount is vibration or sound generated from the robot body 200.

Appendix 6

The robot control apparatus 300 according to any one of Appendixes 1 to 4, wherein the robot body 200 includes a motor 201 that rotates a rotation shaft 204 transmitting power to an arm 203, and the feature amount is a current command value of the motor 201.

Appendix 7

The robot control apparatus 300 according to any one of Appendixes 1 to 6, wherein the estimation unit 304 calculates a life time Lh based on actual operating conditions of the robot body 200 when absence of a sign of malfunction of the robot body 200 is determined.

Appendix 8

A maintenance management method in which
a robot control apparatus 300 executes:
step 401 of controlling drive of a robot body 200;
step 402 of detecting a feature amount quantitatively indicating a deterioration degree of the robot body 200 that is deteriorated over time as the robot body 200 is driven;
step 404 of determining presence/absence of a sign of malfunction of the robot body 200 based on the feature amount; and
step 405 of estimating a remaining life of the robot body 200 when presence of a sign of malfunction of the robot body 200 is determined.

Appendix 9

A maintenance management program 312 which enables a robot control apparatus 300 to execute:
step 401 of controlling drive of a robot body 200;
step 402 of detecting a feature amount quantitatively indicating a deterioration degree of the robot body 200 that is deteriorated over time as the robot body 200 is driven;
step 404 of determining presence/absence of a sign of malfunction of the robot body 200 based on the feature amount; and
step 405 of estimating a remaining life of the robot body 200 when presence of a sign of malfunction of the robot body 200 is determined.

Appendix 10

A computer-readable recording medium that records the maintenance management program 312 according to Appendix 9.

What is claimed is:

1. A robot control apparatus, comprising:
a drive control unit that controls drive of a robot body;
a detection unit that detects a feature amount quantitatively indicating a deterioration degree of the robot body that is deteriorated over time as the robot body is driven;
a determination unit that determines presence/absence of a sign of malfunction of the robot body based on the feature amount; and
an estimation unit that estimates a remaining life of the robot body when presence of a sign of malfunction of the robot body is determined,
wherein the estimation unit estimates, from a tendency of a change over time in the feature amount, a malfunction time at which the feature amount is expected to exceed a threshold value preset to indicate malfunction of the robot body, and estimates duration from a present point to the malfunction time as the remaining life, wherein the present point is a time point after a time point at which the presence of the sign of malfunction of the robot body is determined.

2. The robot control apparatus according to claim 1, wherein
the determination unit determines that there is a sign of malfunction of the robot body when a change quantitatively indicating the deterioration degree of the robot body begins to significantly appear in the feature amount.

3. The robot control apparatus according to claim 1, wherein
the feature amount comprises vibration or sound generated from the robot body.

4. The robot control apparatus according to claim 1, wherein
the robot body comprises an arm and a motor that rotates a rotation shaft transmitting power to the arm, and
the feature amount comprises a current command value of the motor.

5. A maintenance management method in which a robot control apparatus executes:
a step of controlling drive of a robot body;
a step of detecting a feature amount quantitatively indicating a deterioration degree of the robot body that is deteriorated over time as the robot body is driven;
a step of determining presence/absence of a sign of malfunction of the robot body based on the feature amount; and
a step of estimating a remaining life of the robot body when presence of a sign of malfunction of the robot body is determined,
wherein the step of estimating the remaining life comprises:
a step of estimating, from a tendency of a change over time in the feature amount, a malfunction time at which the feature amount is expected to exceed a threshold value preset to indicate malfunction of the robot body, and
a step of estimating duration from a present point to the malfunction time as the remaining life,
wherein the present point is a time point after a time point at which the presence of the sign of malfunction of the robot body is determined.

6. A non-transitory computer readable recording medium storing a maintenance management program which enables a robot control apparatus to execute:
a step of controlling drive of a robot body;
a step of detecting a feature amount quantitatively indicating a deterioration degree of the robot body that is deteriorated over time as the robot body is driven;
a step of determining presence/absence of a sign of malfunction of the robot body based on the feature amount; and
a step of estimating a remaining life of the robot body when presence of a sign of malfunction of the robot body is determined,
wherein the step of estimating the remaining life comprises:
a step of estimating, from a tendency of a change over time in the feature amount, a malfunction time at which the feature amount is expected to exceed a threshold value preset to indicate malfunction of the robot body, and
a step of estimating duration from a present point to the malfunction time as the remaining life,
wherein the present point is a time point after a time point at which the presence of the sign of malfunction of the robot body is determined.

* * * * *